United States Patent
Shin et al.

(10) Patent No.: US 8,037,275 B2
(45) Date of Patent: Oct. 11, 2011

(54) MEMORY MODULE SYSTEM USING A PARTITIONED SERIAL PRESENCE DETECT MEMORY

(75) Inventors: Young-Joon Shin, Yongin-si (KR); Hyoung-Seok Kim, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 872 days.

(21) Appl. No.: 12/000,131

(22) Filed: Dec. 10, 2007

(65) Prior Publication Data

US 2008/0162867 A1 Jul. 3, 2008

(30) Foreign Application Priority Data

Dec. 28, 2006 (KR) .................. 10-2006-0135801

(51) Int. Cl.
*G06F 12/00* (2006.01)
(52) U.S. Cl. ........ 711/173; 711/103; 711/154; 711/156; 711/E12.001; 713/2
(58) Field of Classification Search .................. None
See application file for complete search history.

(56) References Cited

U.S. PATENT DOCUMENTS

| | | | | |
|---|---|---|---|---|
| 5,640,349 A * | 6/1997 | Kakinuma et al. | ........ | 365/185.33 |
| 6,381,685 B2 * | 4/2002 | Dell et al. | ...................... | 711/170 |
| 6,625,692 B1 * | 9/2003 | Stubbs et al. | ................. | 711/115 |
| 2006/0004978 A1 * | 1/2006 | Nakayama | ..................... | 711/170 |
| 2006/0064563 A1 * | 3/2006 | Hobson | ......................... | 711/170 |
| 2006/0230249 A1 * | 10/2006 | Lee et al. | ...................... | 711/170 |

FOREIGN PATENT DOCUMENTS

| | | |
|---|---|---|
| JP | 2002-259227 | 9/2002 |
| KR | 1020010028715 A | 4/2001 |
| KR | 1020030077731 A | 10/2003 |
| KR | 1020040000205 A | 1/2004 |

* cited by examiner

*Primary Examiner* — Michael Krofcheck
(74) *Attorney, Agent, or Firm* — Harness, Dickey & Pierce, P.L.C.

(57) ABSTRACT

A memory module system may include a serial presence detect (SPD) memory and a memory controller. The SPD memory may store first SPD data and second SPD data of a memory module. The SPD memory may be partitioned into at least two regions that may operate as multiple SPD ROMs. The memory controller may boot the memory module system based on a comparison between the first SPD data and the second SPD data when an initialization signal is input to the memory module system. The memory module system may be booted stably and may prevent system breakdowns.

16 Claims, 4 Drawing Sheets

MEMORY MODULE SYSTEM USING A PARTITIONED SERIAL PRESENCE DETECT MEMORY

PRIORITY STATEMENT

This application claims priority under 35 USC §119 to Korean Patent Application No. 10-2006-135801, filed on Dec. 28, 2006 in the Korean Intellectual Property Office (KIPO), the entire contents of which are incorporated herein by reference.

BACKGROUND

1. Field

The example embodiments relate to booting a system, and more particularly to a memory module system using a partitioned serial presence detect (SPD) memory and a method of booting the memory module system.

2. Description of Related Art

Many systems may include a small software program for initially booting a system, basically checking a system, and loading application programs before other programs like, for example, an operating system (OS) operate. Such a small software program may be stored in a read-only memory (ROM) type device. The device may be one of a variety of ROMs. These ROMs may be referred to as SPD ROMs.

FIG. 1 is a block diagram illustrating a conventional SPD ROM.

Referring to FIG. 1, the software program may exist in a used region 110. The conventional SPD ROM 100 may be only partially used since a software program stored in the conventional SPD ROM 100 may be small in size. The software program stored in the conventional SPD ROM 100 may not need large changes. However, the conventional SPD ROM 100 may be changed so as to modify the software program when a load function or a check function of an initial application program is changed. Also, the conventional SPD ROM 100 may need to be changed to recover the software program when an application program of a system (not shown) including the conventional SPD ROM 100 is corrupted. An error in an application program may corrupt a conventional SPD ROM 100 which may cause the software program to fail.

The software program in the conventional SPD ROM 100 may be changed by changing the hardware of the conventional SPD ROM 100 directly or by modifying the software program. However, changing the software program these ways may take a long time.

FIG. 2 is a flow chart illustrating a method of booting a system using a conventional SPD ROM.

Referring to FIG. 2, an initialization signal may be input to the system (S210), and SPD data may be read from the conventional SPD ROM (S220). If the SPD data is normal (S230: YES), booting the system may be finished (S260). If the SPD data is abnormal (S230: NO), booting the system may be performed by using an external memory (S250) or the system may break down (S270). That is, the system may break down or use the external memory when the SPD data is abnormal, so booting the system with a conventional SPD ROM may be unstable.

SUMMARY

Accordingly, the example embodiments are provided to address one or more problems that may exist due to limitations and disadvantages of the related art.

Some example embodiments provide a memory module system which may be booted stably by using a serial presence detect (SPD) memory that may be partitioned into two or more regions.

Some example embodiments provide a method of booting a memory module system using a serial presence detect (SPD) memory that may be partitioned into two or more regions.

In some example embodiments, a memory module system may include a serial presence detect (SPD) memory and a memory controller.

The SPD memory may be mounted on a memory module and may be configured to store first SPD data and second SPD data of the memory module. The SPD memory may be partitioned into at least two regions which may include a first region storing the first SPD data and a second region storing the second SPD data. The second SPD data may be identical to the first SPD data, initially. The memory controller may be configured to boot the memory module system based on a comparison between the first SPD data and the second SPD data when an initialization signal is input to the memory module system.

The first region may be configured to perform only a read operation by being locked after the first SPD data is written to the first region. The second region may be configured to perform a read operation and a write operation. The memory controller may be configured to duplicate the first SPD data to the second region when the second SPD data is different from the first SPD data so as to boot the memory module system. The first region may correspond to an upper byte region of the SPD memory and the second region may correspond to a lower byte region of the SPD memory. Each of the at least two regions may be associated with a start address. The SPD memory may be a nonvolatile memory.

In some example embodiments, the memory controller may be configured to read the first SPD data directly from the first region so as to boot the memory module system when the second SPD data is different from the first SPD data. The first region may correspond to an upper byte region of the SPD memory and the second region may correspond to a lower byte region of the SPD memory. Each region of the at least two regions may be associated with a start address. The memory controller may be configured to designate the start address associated with the first region so as to read the first SPD data directly from the first region. The SPD memory may be a nonvolatile memory.

In further example embodiments, the memory controller may duplicate the first SPD data to the second region by reading the first SPD data, which may be protected, so as to correct the second SPD data when the second SPD data is corrupted.

In some example embodiments, a memory module system may include a memory module, a SPD read-only memory (ROM), and a memory controller.

The memory module may be configured to store data. The SPD ROM may be mounted on the memory module and may be configured to store first SPD data and second SPD data of the memory module, and the SPD ROM may be partitioned into at least two regions including a first region storing the first SPD data and a second region storing the second SPD data. The second SPD data may be identical to the first SPD data, initially. The memory controller may be configured to boot the memory module system based on a comparison between the first SPD data and the second SPD data when an initialization signal is input to the memory module system.

The memory controller may be configured to duplicate the first SPD data to the second region when the second SPD data is different from the first SPD data so as to boot the memory module system.

In some embodiments, the memory controller may be configured to read the first SPD data directly from the first region so as to boot the memory module system when the second SPD data stored is different from the first SPD data.

In some example embodiments, in a method of booting a memory module system where the memory module may have at least a first region that may be a first partition of an SPD memory and a second region that may be a second partition of an SPD memory, an initialization signal may be received; first SPD data, which may be stored in the first region, and second SPD data, which may be stored in the second region, may be read; and the memory module system may be booted based on a comparison between the first SPD data and the second SPD data.

The first region may be configured to perform only read operations by being locked after the first SPD data is written to the first region, and the second region may be configured to perform both read and write operations.

In some embodiments, the first SPD data may be duplicated to the second region when the second SPD data is different from the first SPD data. The first region may correspond to an upper byte region of the SPD memory and the second region may correspond to a lower byte region of the SPD memory. Each region of the at least two regions may be associated with a start address.

In further embodiments, the first SPD data may be read directly from the first region so as to boot the memory module system when the second SPD data is different from the first SPD data. The first region may correspond to an upper byte region of the SPD memory and the second region may correspond to a lower byte region of the SPD memory. Each of the at least two regions may be associated with a start address. The start address, which may be associated with the first region, may be designated so as to read the first SPD data directly from the first region.

In some embodiments, the first SPD data may be duplicated to the second region by reading the first SPD data, which may be protected, so as to correct the second SPD data when the second SPD is corrupted.

Therefore, the memory module system according to the example embodiments may be booted stably without the system breaking down.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DESCRIPTION OF EXAMPLE EMBODIMENTS

Figure 1:
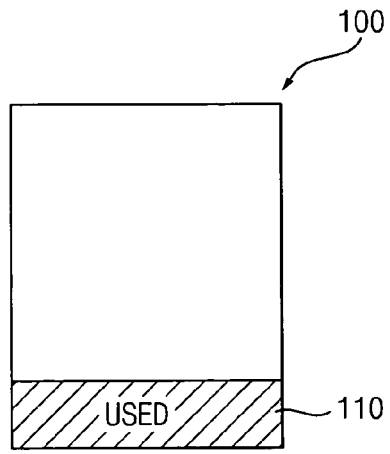
FIG. 1 is a block diagram illustrating a conventional serial presence detect (SPD) read-only memory (ROM).
Figure 2:
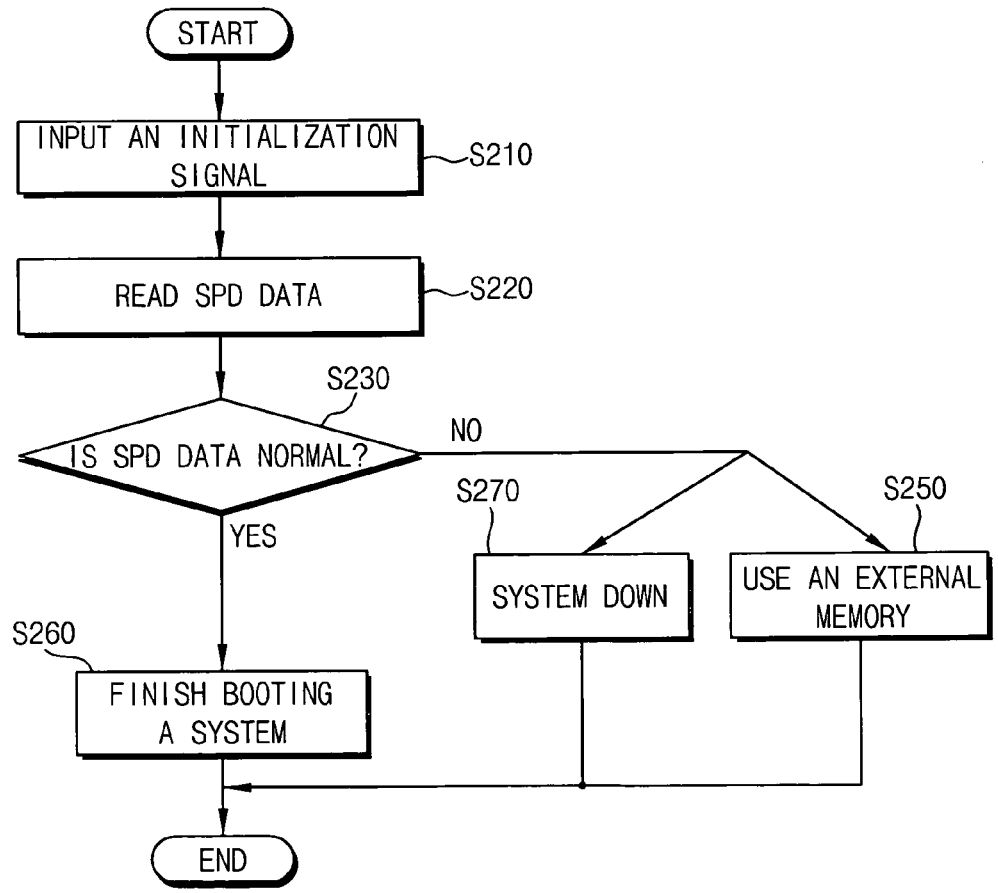
FIG. 2 is a flow chart illustrating a method of booting a system using a conventional SPD ROM.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as that which is commonly understood by one of ordinary skill in the related art. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 3:
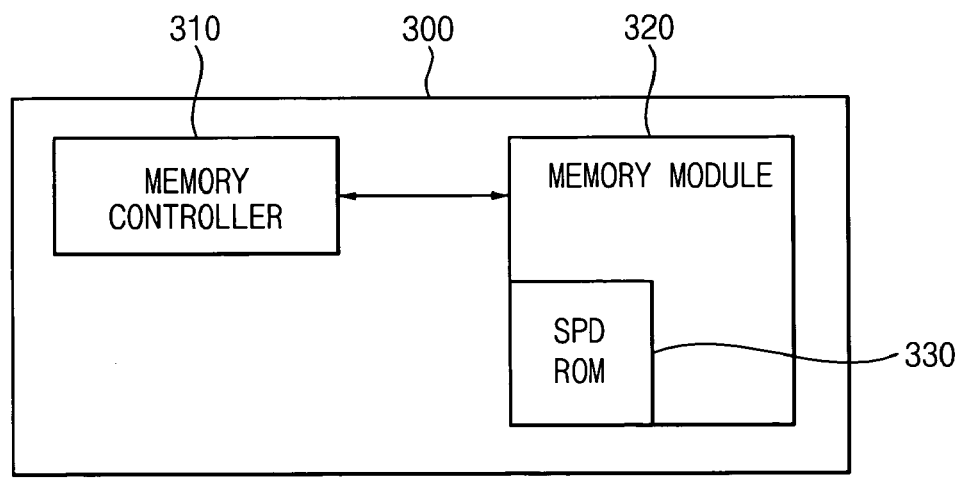
FIG. 3 is a block diagram illustrating a memory module system using a partitioned SPD ROM according to some example embodiments.

FIG. 3 is a block diagram illustrating a memory module system using a partitioned SPD ROM according to some example embodiments.

Figure 4A:
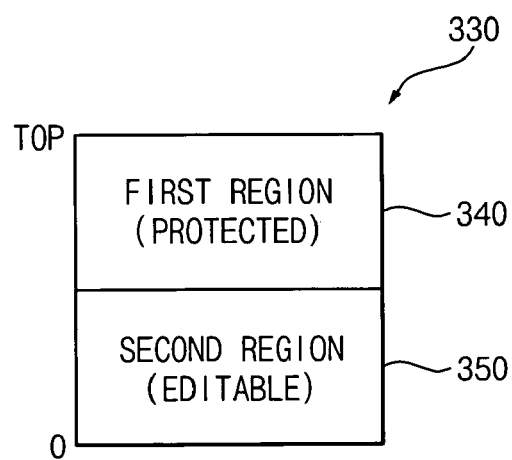
FIG. 4A is a block diagram illustrating the partitioned SPD ROM in FIG. 3.

FIG. 4A is a block diagram illustrating the partitioned SPD ROM in FIG. 3.

Referring to FIGS. 3 and 4A, the memory module system 300 may include a memory controller 310, a memory module 320, and a SPD ROM 330.

The SPD ROM 330 may include a first region 340 and a second region 350. The first region 340 and the second region 350 may be partitions of the SPD ROM 330. The SPD ROM 330 may be partitioned into more regions than the two regions 340 and 350 like, for example, a computer hard disk. A conventional SPD ROM may be used only partially. The SPD ROM 330 according to at least one example embodiment may be divided into regions or partitions and the partitions of the SPD ROM 330 may operate as multiple SPD ROMs. The SPD ROM 330 may be a nonvolatile memory, such as EEPROM, non-volatile SRAM, Flash memory etc.

A plurality of memories may be mounted on the memory module 320. The example embodiments may, however, be embodied in many different forms and should not be construed as limited to a memory module system. Those skilled in the art will recognize that the example embodiments are applicable to any system using a SPD ROM or a boot ROM.

The memory controller 310 may boot the memory module system 300 based on a comparison between first SPD data, which may be stored in the first region 340, and second SPD data, which may be stored in the second region 350, if an initialization signal is input to the memory module system 300.

The first SPD data and the second SPD data may include fundamental information on system memories constituting the memory module 320. The first SPD data and the second SPD data may be identical at the time when the first SPD data and the second SPD data are written to the first region 340 and the second region 350, respectively. Therefore, the second SPD data stored in the second region 350 may be the same as the first SPD data stored in the first region 340 before the memory module system 300 initially operates.

The first region 340 may be locked to prohibit write operations after the first SPD data is written to the first region 340, so the first region 340 may perform only read operations. However, the second region 350 may perform read operations and write operations since the second region 350 may not be locked. Therefore, the first SPD data may be protected until the first region 350 is unlocked. The first region 340 may be an upper byte region of the SPD ROM 330 and the second region 350 may be a lower byte region of the SPD ROM 330. Each of the first region 340 and the second region 350 may be associated with a start address. Moreover, if the SPD ROM 330 is partitioned into more than two regions, a start address may be assigned to each corresponding region.

If the initialization signal is input to the memory module system 300, for example, when a user turns on power or presses a reset button, then the memory controller 310 may read and compare the second SPD data with the first SPD data. As a comparison result, if the second SPD data is the same as the first SPD data, booting the memory module system 300 may be completed.

However, if the second SPD data is not identical to the first SPD data, the memory controller 310 may duplicate the first SPD data to the second region 350 so as to complete booting the memory module system 300. Alternatively, the memory controller 310 may read the first SPD data directly from the first region 340 so as to complete booting the memory module system 300 when the second SPD data is different from the first SPD data. The memory controller 310 may designate the start address associated with the first region 340 so as to read the first SPD data directly. The memory controller 310 may designate an upper byte of the SPD ROM 300 where the first region 340 may be located so as to read the first SPD data directly.

The memory controller 310 may automatically perform recovery operations like, for example, duplicating the first SPD data or reading the first SPD data directly, when the second SPD data is not identical to the first SPD data. Therefore, the memory module system 300 may not break down and may operate stably without an external memory when the memory module system 300 is booted.

If it is necessary to modify the first SPD data, the first region 340 may be unlocked to modify the first SPD data, and then the first region 340 may be locked again after modification of the first SPD data is finished. As such, the first region 340 may be programmable when the first region 340 is unlocked.

Figure 4B:
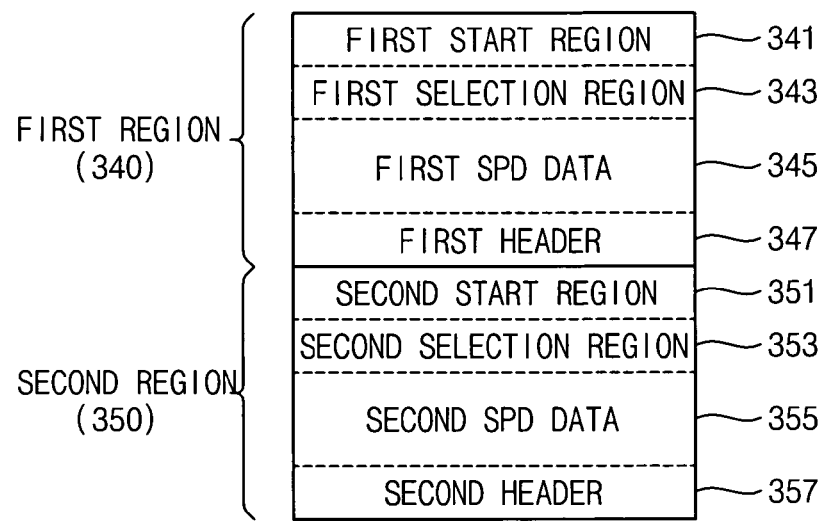
FIG. 4B is a block diagram illustrating a configuration of the partitioned SPD ROM of FIG. 4A.

FIG. 4B is a block diagram illustrating a configuration of the partitioned SPD ROM of FIG. 4A.

Referring to FIG. 4B, the first region 340 may include a first start region 341, a first selection region 343, the first SPD data 345, and a first header 347. The second region 350 may include a second start region 351, a second selection region 353, the second SPD data 355, and a second header 357.

The first start region 341 and the second start region 351 may be small program regions that may operate at reset addresses of the SPD ROM 330. The first selection region 343 and the second selection region 353 may have a function that may allow the first SPD data 345 or the second SPD data 355 to be selected for booting the memory module system 300. The memory controller 310 may attempt to boot the memory module system 300 first with the second SPD data 355. The first SPD data 345 and the second SPD data 355 may be substantial programs that are used to boot the memory module system 300. The first head 347 and the second head 357 may include information, such as version, etc., about the first SPD data 345 and the second SPD data 355.

Figure 5:
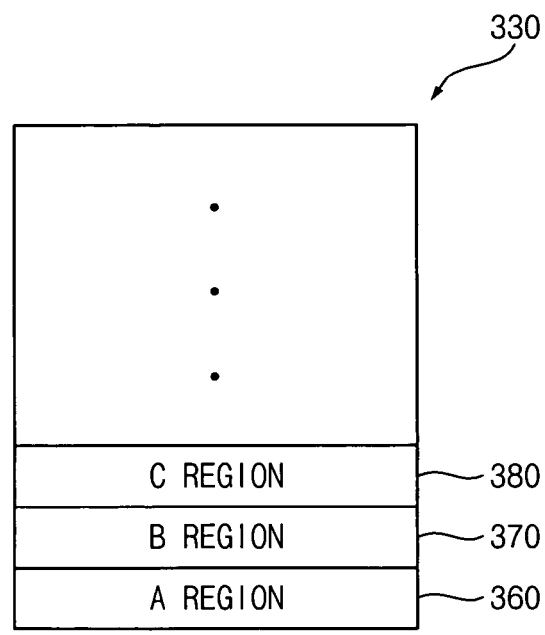
FIG. 5 is a block diagram illustrating the SPD ROM of FIG. 3, which is partitioned into more than three regions.

FIG. 5 is a block diagram illustrating the SPD ROM of FIG. 3, which is partitioned into more than three regions.

Referring to FIG. 5, the SPD ROM 330 partitioned into multiple regions may include an A region 360, a B region 370, and a C region 380. Start addresses may be assigned to the A region 360, the B region 370, and the C region 380. If arbitrary two regions of the multiple regions are used as the first region and the second region as described with respect to FIG. 4A, the memory module system may be booted stably.

Figure 6:
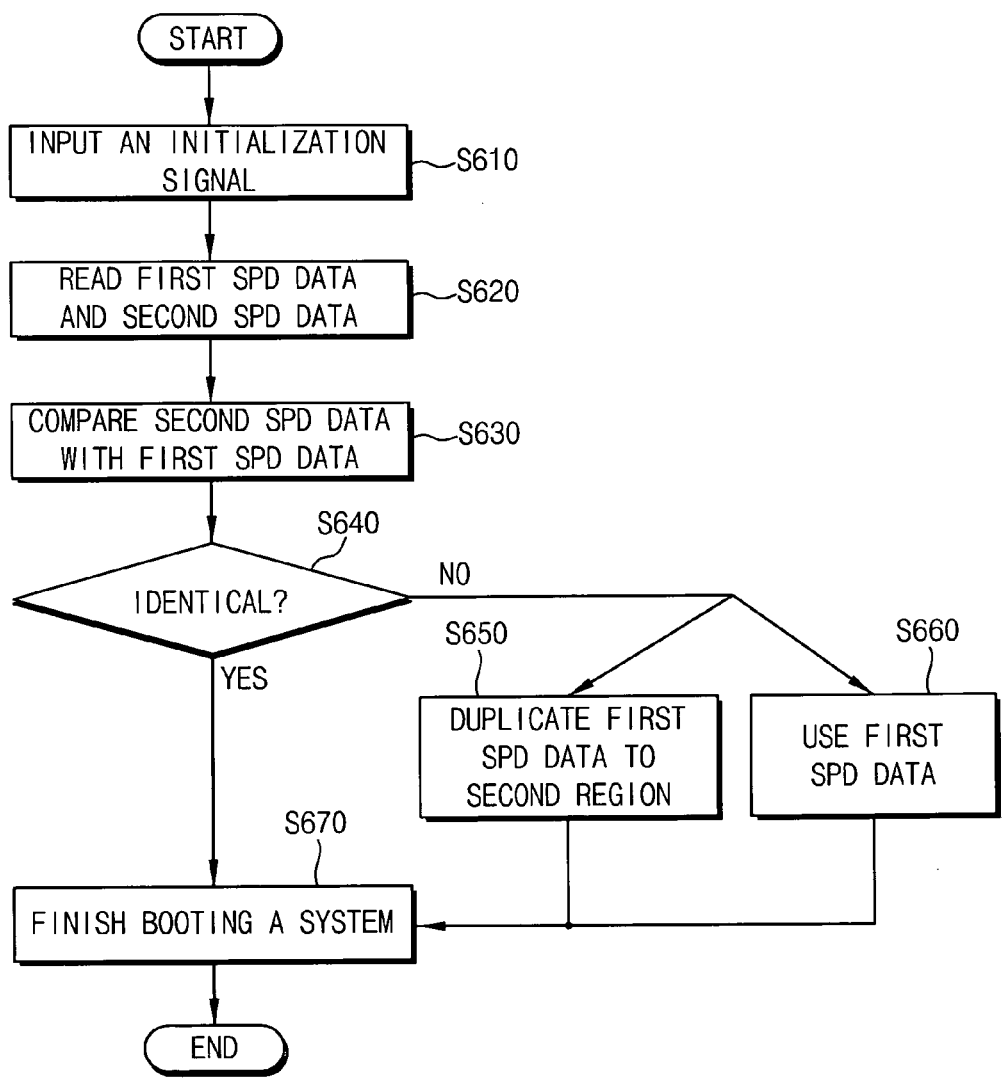
FIG. 6 is a flow chart illustrating a method of booting a memory module system according to some example embodiments.

FIG. 6 is a flow chart illustrating a method of booting a memory module system according to some example embodiments.

Referring to FIG. 6, the method of booting the memory module system according to at least one example embodiment may include receiving an initialization signal S610; reading first SPD data, which may be stored in a first region, and second SPD data, which may be stored in a second region S620; and booting the memory module system based on a comparison between the first SPD data and the second SPD data S630.

Hereinafter, the method of booting the memory module system according to an example embodiment will be described with reference to FIGS. 3 through 6.

The initialization signal may be input (S610) to the memory module system 300, for example, when a user turns on power or presses a reset button, and the memory controller 310 may read the first SPD data, which may be stored in the first region 340, and the second SPD data, which may be stored in the second region 350 (S620). The first region 340 may be configured to perform only read operations since the first region 340 may be locked after the first SPD data is written to the first region 340. Therefore, the first SPD data may be protected until the first region 340 is unlocked. The second region 350 may perform both read operations and write operations since the second region 350 may not be locked. The first region 340 may be an upper byte region of the SPD ROM 330 and the second region 350 may be a lower byte region of the SPD ROM 330. Each region may be associated with a start address.

The memory controller 310 may compare the second SPD data, which may be stored in the second region 350, with the first SPD data, which may be stored in the first region 340 (S620). If the second SPD data is the same as the first SPD data (S640: YES), booting the memory module system 300 may be completed (S670). If the second SPD data is not identical to the first SPD data (S640: NO), or if the second SPD data is changed or corrupted, the memory controller 310 may duplicate the first SPD data to the second region 350 (S650) so as to complete booting the memory module system 300 (S670).

Alternatively, if the second SPD data is different from the first SPD data (S640: NO), the memory controller 310 may read the first SPD data directly from the first region 340 so as to complete booting the memory module system 300 by using the first SPD data (S660), which may be protected. The memory controller 310 may designate the start address associated with the first region 340 so as to read the first SPD data directly. The memory controller 310 may designate an upper byte of the SPD ROM 300 where the first region 340 may be located so as to read the first SPD data directly.

As mentioned above, the memory module system and the method of booting the memory module system according to some embodiments may prevent an abnormal operation and a boot error caused by a SPD data corruption since the memory module system may use the SPD ROM partitioned into two or more regions which may operate as multiple SPD ROMs like, for example, a computer hard disk. The memory module system may not break down and may operate stably without an external memory when the memory module system is booted. The example embodiments may be realized in many different forms and should not be construed as being limited to a memory module system. Those skilled in the art will recognize that the example embodiments are applicable to any system using a SPD ROM or a boot ROM.

While the example embodiments and a number of their advantages have been described in detail, it should be understood that various changes, substitutions and alterations may be made herein without departing from the scope of the example embodiments.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A memory module system, including:
a serial presence detect (SPD) memory configured to store first SPD data and second SPD data of a memory module, the SPD memory being partitioned into at least two regions including a first region storing the first SPD data and a second region storing the second SPD data, the second SPD data initially being identical to the first SPD data; and
a memory controller configured to boot the memory module system based on a comparison between the first SPD data and the second SPD data when an initialization signal is input to the memory module system,
wherein the first region is configured to perform only a read operation by being locked after the first SPD data is written to the first region, and the second region is configured to perform a read operation and a write operation, and
wherein the SPD memory is located in a memory module, the SPD memory stores information about a plurality of memories included in the memory module, and the memory module is different from the memory controller.

2. The memory module system of claim 1, wherein the memory controller is configured to duplicate the first SPD data to the second region when the second SPD data is different from the first SPD data so as to boot the memory module system.

3. The memory module system of claim 2, wherein the first region corresponds to an upper byte region of the SPD memory and the second region corresponds to a lower byte region of the SPD memory.

4. The memory module system of claim 3, wherein each region of the at least two regions is associated with a start address.

5. The memory module system of claim 2, wherein the SPD memory is a nonvolatile memory.

6. The memory module system of claim 1, wherein the memory controller is configured to read the first SPD data directly from the first region so as to boot the memory module system when the second SPD data is different from the first SPD data.

7. The memory module system of claim 6, wherein the first region corresponds to an upper byte region of the SPD memory and the second region corresponds to a lower byte region of the SPD memory.

8. The memory module system of claim 7, wherein each region of the at least two regions is associated with a start address.

9. The memory module system of claim 8, wherein the memory controller is configured to designate the start address associated with the first region so as to read the first SPD data directly from the first region.

10. The memory module system of claim 6, wherein the SPD memory is a nonvolatile memory.

11. The memory module system of claim 1, wherein the memory controller duplicates the first SPD data to the second region by reading the first SPD data so as to correct the second SPD data when the second SPD data is corrupted.

12. The memory module system of claim 1 where the SPD memory is mounted on the memory module.

13. A memory module system, including:
a memory module configured to store data;
a serial presence detect (SPD) read-only memory (ROM) configured to store first SPD data and second SPD data of a memory module, the SPD ROM being partitioned into at least two regions including a first region storing the first SPD data and a second region storing the second SPD data, the second SPD data initially being identical to the first SPD data; and a memory controller configured to boot the memory module system based on a comparison between the first SPD data and the second SPD data when an initialization signal is input to the memory module system, wherein the first region is configured to perform only a read operation by being locked after the first SPD data is written to the first region, and the second region is configured to perform a read operation and a write operation, and wherein the memory module includes a plurality of memories, the SPD ROM is located in the memory module, the SPD ROM stores information about the plurality of memories, and the memory module is different from the memory controller.

14. The memory module system of claim 13, wherein the memory controller is configured to duplicate the first SPD data to the second region when the second SPD data is different from the first SPD data so as to boot the memory module system.

15. The memory module system of claim 13, wherein the memory controller is configured to read the first SPD data directly from the first region so as to boot the memory module system when the second SPD data stored is different from the first SPD data.

16. The memory module system of claim 13 where the SPD ROM is mounted on the memory module.

* * * * *